United States Patent [19]

Fuentevilla

[11] 4,212,889
[45] Jul. 15, 1980

[54] METHOD FOR PROCESSING FISH CONTINUOUSLY AND SERIALLY THROUGH A PLURALITY OF VESSELS

[75] Inventor: Manuel E. Fuentevilla, Cherry Hill, N.J.

[73] Assignee: The De Laval Separator Company, Poughkeepsie, N.Y.

[21] Appl. No.: 907,335

[22] Filed: May 18, 1978

[51] Int. Cl.² .................................................. A22C 25/00
[52] U.S. Cl. .................................... 426/7; 23/230 A; 137/575; 414/296; 417/2; 417/40; 422/106; 422/110; 422/308; 426/9; 426/231; 426/643
[58] Field of Search ............. 426/7, 9, 56, 643, 520, 426/231, 506, 509; 99/334; 23/230 A; 422/106, 110, 111, 307, 308; 406/23, 24, 25, 32, 33; 417/2, 40; 137/575, 566; 414/294, 296, 323; 222/57

[56] References Cited

U.S. PATENT DOCUMENTS

| | | | |
|---|---|---|---|
| 2,653,084 | 9/1953 | Greenbank | 422/308 |
| 3,003,880 | 10/1961 | Erickson | 426/7 |
| 3,095,280 | 6/1963 | Soudan et al. | 426/106 |
| 3,249,442 | 5/1966 | Keyes et al. | 426/643 |
| 3,468,674 | 9/1969 | Levin | 426/643 |
| 3,547,652 | 12/1970 | Jeffreys | 426/7 |
| 3,959,518 | 5/1976 | Vincent | 426/643 |
| 4,036,993 | 7/1977 | Ikeda et al. | 426/7 |

Primary Examiner—S. Leon Bashore
Assistant Examiner—Steve Alvo
Attorney, Agent, or Firm—Davis, Hoxie, Faithfull & Hapgood

[57] ABSTRACT

A method of processing fish in which whole fish are reduced to fish solubles in aqueous solution and to fish solids comprising bones and scales. Fish are continuously processed in a series of interconnected vessels so that a continuous steady-state discharge of product is obtained and so that additional fish can be introduced into the system during discharge of product.

4 Claims, 2 Drawing Figures

METHOD FOR PROCESSING FISH CONTINUOUSLY AND SERIALLY THROUGH A PLURALITY OF VESSELS

This invention comprises a method of processing fish in which whole fish are reduced to fish solubles in aqueous solution and to fish solids comprising bones and scales. More particularly, this invention relates to a method of continuously processing fish in a series of interconnected vessels so that a continuous steady-state discharge of product is obtained and so that additional fish can be introduced into the system while the product is discharged. In a preferred embodiment of this invention, the aqueous diluent used in the processing is obtained by reclaiming and recycling water from the product mixture.

The preferred prior art method of enzymatically processing fish has been batch processing as described in U.S. Pat. No. 3,249,442. According to this method freshly caught fish, after being combined with an aqueous diluent, a proteolytic enzyme, a preservative and a chelating agent, are retained in a single tank until degradative processing is complete. However, the prior art method has significant drawbacks. Because of irregular catch schedules and the intermittent availability of raw fish starting material, the prior art batch processing method necessitates a choice between high equipment expenditures for a system large enough to handle each batch of fish in its entirety as it becomes available, and refrigeration storage, with associated drawbacks of loss of freshness, time delays, and refrigeration expense. Furthermore, the fish product is discharged from the tank on a sporadic basis, resulting in decreased efficiency of downstream operations.

The present invention overcomes these drawbacks by providing a method of continuously processing fish wherein a continuous steady-state discharge of product can be obtained and wherein additional fish can be introduced into the system during discharge of product. The invention optimizes availability of processing equipment, thereby avoiding the choice between high equipment expenditures and refrigeration storage, and resulting in significant savings of time and expense. Furthermore, by providing continuous discharge of product, the invention permits increased efficiency of downstream operations, thus permitting reduction in size of downstream equipment.

The invention therefore includes a method for continuously processing fish to fish solubles and fish solids which comprises passing a mixture of fish and processing reagents serially through a reaction system comprising a plurality of vessels, and controlling the flow of mixture from each vessel to the next vessel through the use of two control modes. In the first mode, mixture is transferred from a given vessel to the next vessel in response to the level of mixture in the given vessel being above a predetermined level. In the second mode, mixture is transferred into a given vessel from the preceding vessel in response to the level of mixture in the given vessel being below a predetermined level. The control modes are used in such a way that product can be continuously discharged from the last vessel of the reaction system at a steady rate and that fish can be introduced into the first vessel of the reaction system while product is being discharged.

In a preferred embodiment of the invention, the method comprises setting each vessel in the first mode at the time of initial introduction of mixture into the system; subsequently changing the second and each succeeding vessel to the second mode at the time of first discharge from the last vessel or at the time of cessation of introduction of mixture into the system, whichever is later; and returning each vessel operating in the second mode to the first mode after the preceding vessel has been emptied of mixture.

The processing reagents normally comprise a proteolytic enzyme, an antibiotic preservative and an aqueous diluent. In a preferred embodiment the aqueous diluent comprises water separated by distillation from the mixture discharged from the processing system. In a specific preferred embodiment, the water separated by distillation is separated by distillation carried out at less than atmospheric pressure.

The invention also comprises a fish processing system comprising a plurality of vessels serially connected, means for furnishing a mixture of raw fish and processing reagents to the first vessel in said system, means for conveying mixture from one vessel to the next, means for discharging product mixture from the last vessel in said system, flow control means for the first vessel operable to initiate discharge from said vessel in response to the mixture level in said vessel, and flow control means for the second and each succeeding vessel in said series operable in a first mode for initiating discharge of mixture from said vessel in response to the mixture level in said vessel and operable in a second mode for controlling input to said vessel in response to the mixture level in said vessel, said control means including switch means for setting the mode of said control means.

In a preferred feature of the invention distilling means are provided for recovering water from the product mixture and means are provided for recycling said water for use as one of the processing reagents. In a further preferred feature of the invention the distilling means comprises means for distilling at less than atmospheric pressure.

The invention will be further described with reference to the accompanying drawings in which.

Figure 1:
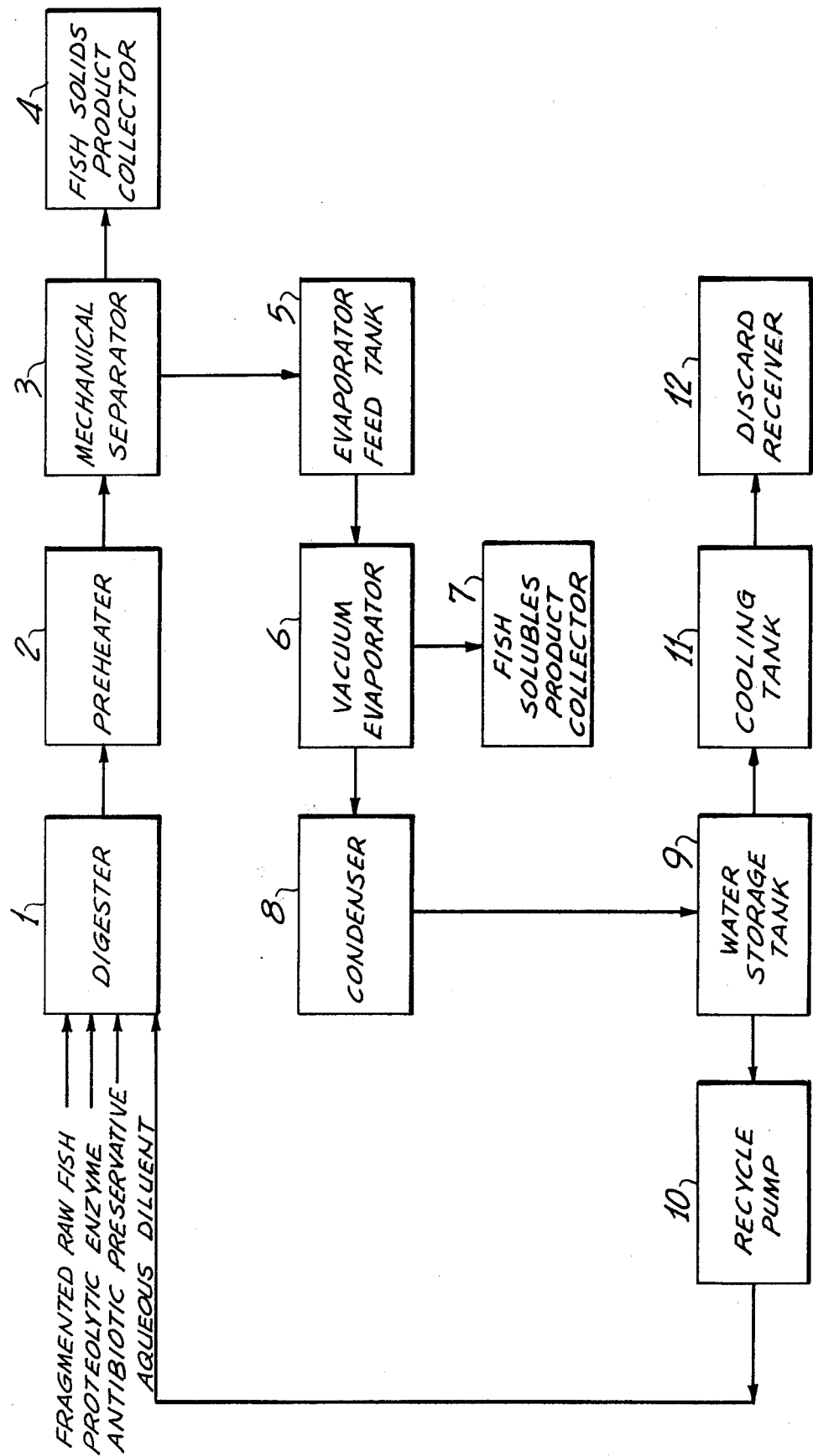
FIG. 1 is a schematic diagram of a fish processing system in which fish is processed according to the method of the invention.

Referring first to FIG. 1, fragmented raw fish, proteolytic enzyme, antibiotic preservative and aqueous diluent are introduced into digester 1. Introduction of a pH-adjusting agent may also be necessary, depending on the nature of the fish and the operating range of the enzyme. The digesting process comprises enzymatic hydrolysis of fish protein to amino acids.

Complete digestion takes approximately 12 hours, after which time the mixture of fish solids and fish solubles is discharged from digester 1 and introduced into preheater 2. In preheater 2 the mixture is stabilized by heating to approximately 70° C. under low pressure steam, so as to arrest the hydrolysis and inhibit bacterial growth.

The mixture is passed from preheater 2 to mechanical separator 3, where vibratory separating screens (not shown) mechanically remove the fish solids product, which comprises bones and scales. The product is then transferred to fish solids product collector 4. The fish solids product is washed, dried and ground prior to commercial packaging.

The liquid phase of the mixture, after passing through mechanical separator 3, is transferred, via evaporator feed tank 5, to vacuum evaporator 6. An evaporator of choice is a scrapped surface evaporator of the CONVAP type, manufactured by the Contherm Corporation of Newburyport, Massachusetts. Water is evaporated under moderate vacuum conditions, approximately 5 psia, with steam as the heating medium. Evaporation is carried out to the point where an approximately 44% by weight solution of fish solubles results. The fish solubles product is passed from vacuum evaporator 6 to fish solubles product collector 7, where the product is pH adjusted prior to commercial packaging.

Water evaporated by vacuum evaporator 6 is collected in condenser 8 and transferred to water storage tank 9. The minimal quantities of volatile odor-causing compounds in the water may be removed by venting storage tank 9 to the atmosphere. Water thus collected and stored is obtained in sufficient quantity to satisfy all water needs of the operation, including requirements for aqueous diluent in digester 1. Water needed for use as aqueous diluent is transferred from water storage tank 9 to digester 1 by means of recycle pump 10.

Water collected in water storage tank 9 that is not required for water needs of the operation is sent first to cooling tank 11, and then to discard receiver 12, from which final discharge is made.

Figure 1A:
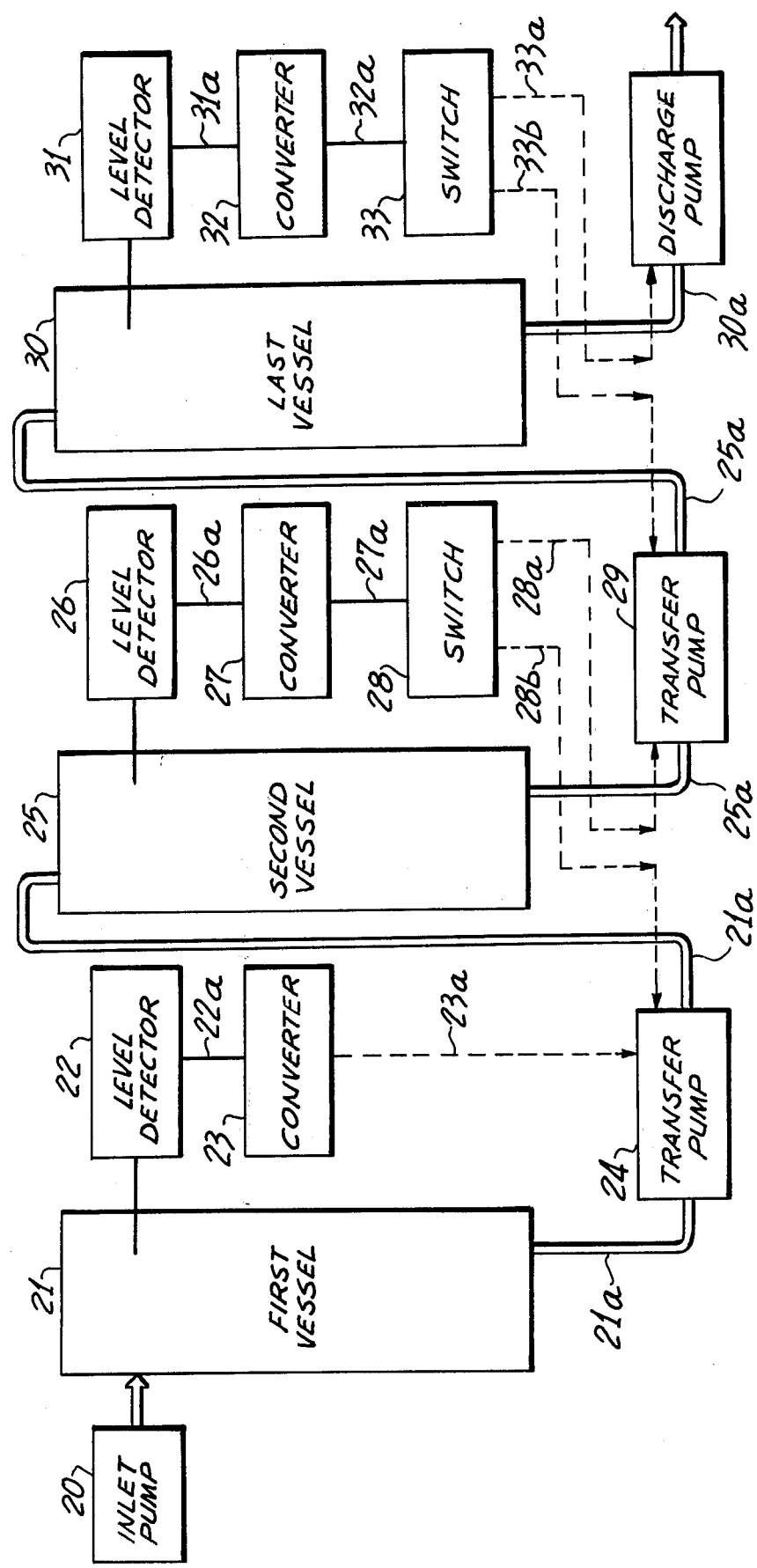
FIG. 1A is a schematic diagram of the portion of FIG. 1 in which digesting of fish raw material takes place.

Referring to FIG. 1A, digester 1 of FIG. 1 is shown as a system comprising first vessel 21, second vessel 25 and last vessel 30; inlet pump 20 for introducing mixture into first vessel 21, transfer pumps 24 and 29 for transferring mixture from vessel to vessel, and discharge pump 34 for discharging mixture from last vessel 30; and level detectors, converters and switches associated with the vessels for controlling the flow of mixture through the system. While the method of the invention could be employed in a system containing a series of two vessels, it is recommended that a series of at least three vessels be used. The preferred number of vessels will depend on vessel size and the nature of the processing operation. The vessels are preferably of stainless steel construction, with steam jackets and suitable agitation devices (not shown).

Fragmented raw fish and processing reagents are introduced into first vessel 21 by inlet pump 20. At the time of initial introduction all vessels in the system are in the first control mode, the feed forward mode, so that, as will be explained, mixture is discharged from each vessel when the mixture reaches a predetermined level in that vessel.

As mixture is introduced into first vessel 21, the level of mixture is monitored by level detector 22 which measures mixture level in the vessel and emits a signal proportional to that level. Level detector 22 can be any of a number of standard types of level-sensing instruments, but a diaphragm-type instrument that emits a pneumatic signal is recommended. Such an instrument is the Transcope Pneumatic Transmitter and Diaphragm manufactured by Taylor Instrument Company of Pinebrook, New Jersey. Alternatively, level-sensing instruments that emit a mechanical or electrical signal could be employed.

Converter 23, which receives the signal emitted from level detector 22, through level 22a, is activated when the mixture level in first vessel 21 reaches the predetermined level. Converter 23 translates the signal from level detector 22 into another signal, the intensity of which is proportional to the extent to which the mixture level exceeds the predetermined level. Converter 23 sends the new signal through line 23a to transfer pump 24, the outlet pump for first vessel 21.

In a system where level detector 22 emits a pneumatic signal, as recommended, and where transfer pump 24 is responsive to an electric signal, a transducer, not shown, is located between converter 23 and transfer pump 24 for converting the pneumatic signal into an electrical signal. The Level Indicating Controller, 440R series, manufactured by Taylor Instrument Company of Pinebrook, New Jersey, is recommended for use as converter 23. Other instruments could alternatively be used, depending on the type of signal emitted by level detector 22 and the type of signal to which transfer pump 24 is responsive to.

Transfer pump 24 transfers mixture from first vessel 21 (i.e., a transfer vessel to second vessel 25 (i.e., a transferee vessel) through line 21a, and is preferably of variable speed. The speed of transfer pump 24 increases proportionately with the intensity of the signal from converter 23, which in turn is proportional to the extent to which the mixture level in first vessel 21 exceeds the predetermined level. Thus, the speed of transfer pump 24 is proportional to the rate of filling the first vessel 21, and mixture can be continuously introduced into first vessel 21 with problems of overfilling first vessel 21 avoided and with a steady-state condition in first vessel 21 maintained.

As mixture continues to be introduced into first vessel 21 and transferred to second vessel 25, the rising mixture level within second vessel 25 is monitored by level detector 26. Level detector 26 is the same type of instrument as the previously described level detector 22. When the mixture level reaches the predetermined level, converter 27, which receives the signal passing through line 26a from level detector 26, is activated. Converter 27 is the same type of instrument as the previously described converter 23. Converter 27 sends a signal through line 27a to switch 28. The intensity of the signal is proportional to the extent to which the mixture level in second vessel 25 exceeds the predetermined level. Switch 28 can be selected from any of a number of standard types of instruments which are capable of directing the signal from converter 27 either to transfer pump 29, through line 28a, or to transfer pump 24, through line 28b.

Since second vessel 25 is at this point on feed forward control, switch 28 sends the signal from converter 27 to transfer pump 29 through line 28a. Transfer pump 29, the oulet pump for second pump 29, then begins transfer of mixture from second vessel 25 to the next vessel in series. Since the speed of transfer pump 29 is proportional to the extent to which the mixture level of second vessel 25 exceeds the predetermined level, problems of overfilling second vessel 25 are avoided and a steady-state condition in second vessel 25 is maintained.

If more than three vessels are in series, transfer pump 29 introduces the mixture into the third vessel and the mixture then passes from vessel to vessel in like manner to that previously described for transfer of mixture from first vessel 21 to second vessel 25.

As shown in FIG. 1A, transfer pump 29 transfers the mixture from second vessel 25 into last vessel 30 through line 25a. As mixture continues to be transferred to last vessel 30, the rising mixture level within last vessel 30 is monitored by level detector 31. Level detector 31 is the same type of instrument as the previously described level detectors 22 and 26. When the mixture level reaches the predetermined level, converter 32, which receives the signal passing through line 31a from level detector 31, is activated. At this point in time, through proper control of the rate of introduction into first vessel 21 and through proper setting of the predetermined levels, approximately 12 hours will have elapsed from initial introduction into first vessel 21, and the mixture in last vessel 30 will be fully processed. Converter 32 is the same type of instrument as the previously described converters 23 and 27. Converter 32 sends a signal through line 32a to switch 33. Switch 33 is the same type of instrument as the previously described switch 28. Since last vessel 30 is at this point on feed forward control, switch 33 sends the signal from converter 32 to discharge pump 34 through line 33a. Discharge pump 34, the outlet pump for last vessel 30, discharges processed fish mixture from the digester via line 30a and transfers it to preheater 2 of FIG. 1 for heat stabilization. The mixture is subsequently treated in accordance with the steps previously described in reference to FIG. 1.

Once discharge pump 34 is activated, it remains continuously activated and it continuously discharges mixture from the digestor system until the entire batch of mixture has been discharged. Flow through discharge pump 34 may be regulated by a flow controller, not shown, that insures, constant, continuous discharge from the system at the desired rate. This rate will normally be less then the rate of introduction of mixture into the system.

At the time of initial discharge from last vessel 30 of FIG. 1A, some of the vessels in the system may be switched to the second mode of control, feed backward control, depending on whether introduction of mixture into first vessel 21 has been completed. If introduction of mixture into first vessel 21 has been completed at the time of initial discharge from last vessel 30, each vessel which can be fed mixture from the preceding vessel is swtiched to feed backward control. Note, however, that first vessel 21, which does not have a preceding vessel, is never switched to feed backward control. In the feed backward control mode, discharge from a given vessel (i.e., a transferor vessel) through its transfer pump is controlled by the level detector, converter and switch of the subsequent vessel, in response to the mixture level in the subsequent vessel (i.e., a transferee vessel) being below a predetermined level. That is, if the level of mixture in a given vessel drops below a predetermined level, the converter for that vessel is activated and sends a signal to the outlet pump for the preceding vessel. As with the feed forward mode, the intensity of the signal is proportional to the difference between the mixture level and the predetermined level. Since the speed of the outlet pump for the preceding vessel is proportional to the extent to which the mixture level of the given vessels drops below the predetermined level, steady-state conditions in the given vessel are obtained.

In FIG. 1A, if at the time of initial discharge from last vessel 30 introduction of mixture into first vessel 21 has been completed, but mixture remains in first vessel 21, second vessel 25 and last vessel 30 are switched to feed backward control by switching switch 28 to line 28b and switch 33 to line 33b, respectively. As mixture is discharged from last vessel 30, the mixture level of last vessel 30 falls below the predetermined level and, since last vessel 30 is now on feed backward control, a signal from converter 32 through line 32a is sent by switch 33 through line 33b to transfer pump 29. Transfer pump 29 then transfers mixture from second vessel 25 and a steady-state condition in last vessel 30 results even though discharge pump 34 continues to discharge product. As mixture is transferred from second vessel 25 to last vessel 30, the mixture level of second vessel 25 falls below the predetermined level and, since second vessel 25 is now on feed backward control, a signal from converter 27 through line 27a is sent by switch 28 through line 28b to transfer pump 24. Transfer pump 24 then transfers mixture from first vessel 21 and a steady-state condition results in second vessel 25. When first vessel 21 empties, a signal from level detector 22 and converter 23 overrides the signal that transfer pump 24 is receiving from switch 28, and transfer pump 24 is stopped. Second vessel 25 is then returned to the feed forward mode, in anticipation of the introduction of another batch of mixture, by switching switch 28 from line 28b to line 28a. Meanwhile, mixture continues to be transferred from second vessel 25 to last vessel 30 under control of the feed backward control mode of last vessel 30. When second vessel 25 empties, a signal from level detector 26 and converter 27 overrides the signal that transfer pump 29 is receiving from switch 33, and transfer pump 29 is stopped. Last vessel 30 is then returned to the feed forward mode, in anticipation of the introduction of another batch of mixture, by switching switch 33 from line 33b back to line 33a. Discharge of mixture from last vessel 30 continues until last vessel 30 empties, at which time a signal from level detector 31, converter 32, switch 33 and line 33a stops discharge pump 34.

If introduction of mixture into first vessel 21 continues at the time of initial discharge from last vessel 30, all vessels remain in the feed forward control mode. Use of this mode assures that mixture will be passed through the system as it is introduced, and that no vessel overfills. Once introduction of mixture into first vessel 21 ceases, however, all vessels other than first vessel 21 are switched to feed backward control. The vessels than sequentially empty, with steady-state conditions in each vessel prior to emptying and with continuous discharge from last vessel 30 until last vessel 30 empties. Second vessel 25 is returned to feed forward mode after first vessel 21 empties and last vessel 30 is returned to feed forward mode after second vessel 25 empties.

The switching of modes from feed forward control to feed backward control, and then back to feed forward control, may be accomplished manually on each switch or automatically by a master control unit (not shown) capable of sensing the input and discharge.

Control of the transfer and discharge pumps by the level-sensing devices may be bypassed to allow direct manual control of the pumps by means of manual regulators (not shown).

The described system has the important feature of being able to accept introduction of a different batch of mixture into the first vessel while the first batch of mixture is still being processed and discharged. Thus, as soon as first vessel 21 empties, the system is ready to accept another batch of fish raw material.

An added feature of the method of continuous processing is the fact that the apparatus used in agitation of the mixture may be varied from vessel to vessel to fit the viscosity of the mixture in the vessel. More powerful and more durable agitators can thus be used in the first and second vessels, where the mixture viscosity is considerably higher than that of mixture in the terminal vessels. In a batch operation the strength of the agitators would be determined by the initial viscosity of the mixture.

The operation described is capable of running continuously for extended periods, for example for 30 hours. After such time it may be necessary to cease operation for several hours to permit cleaning of the vessels. If shut-down is undesirable, the system can be modified to have substitute vessels through which the mixture can be shunted during the cleaning of primary vessels, thereby permitting the operation to run continuously for an indefinite period of time.

What is claimed is:

1. A method for continuously processing fish to fish solubles and fish solids which comprises continuously passing a mixture of fish and processing reagents serially through a reaction system comprising a plurality of vessels, and controlling the flow of mixture from each vessel to the next, in a first mode of initial introduction of mixture into said system, by transferring the mixture from vessel to vessel in response to the level of mixture in the transferor vessel being above a predetermined level, subsequently changing the second and succeeding vessels to a second mode at the time of first discharge of product from the last vessel or at the time of cessation of introduction of mixture into the system, whichever is later, by transferring the mixture from vessel to vessel in response to the level of mixture in the transferee vessel being below a predetermined level, and returning each vessel operating in the second mode to the first mode after the preceeding vessel has been emptied of mixture, wherein product can be continuously discharged from the last vessel of said reaction system at a steady rate and fish can be introduced into the first vessel of said reaction system while product is being discharged.

2. The method as claimed in claim 1, wherein the processing reagents comprise a proteolytic enzyme, an antibiotic preservative and an aqueous diluent.

3. The method as claimed in claim 2, wherein the aqueous diluent comprises water separated by distillation from the mixture discharged from the processing system.

4. The method as claimed in claim 3, wherein said distillation is carried out at less than atmospheric pressure.

* * * * *